US012317915B2

(12) United States Patent
Kitano et al.

(10) Patent No.: US 12,317,915 B2
(45) Date of Patent: Jun. 3, 2025

(54) METHOD FOR PRODUCING INSTANT FRIED NOODLES

(71) Applicant: NISSIN FOODS HOLDINGS CO., LTD., Osaka (JP)

(72) Inventors: Sho Kitano, Osaka (JP); Eriko Kanai, Osaka (JP); Mitsuru Tanaka, Osaka (JP)

(73) Assignee: NISSIN FOODS HOLDINGS CO., LTD., Osaka (JP)

( * ) Notice: Subject to any disclaimer, the term of this patent is extended or adjusted under 35 U.S.C. 154(b) by 0 days.

(21) Appl. No.: 15/761,683

(22) PCT Filed: Feb. 15, 2017

(86) PCT No.: PCT/JP2017/005416
§ 371 (c)(1),
(2) Date: Mar. 20, 2018

(87) PCT Pub. No.: WO2017/145885
PCT Pub. Date: Aug. 31, 2017

(65) Prior Publication Data
US 2018/0352838 A1    Dec. 13, 2018

(30) Foreign Application Priority Data

Feb. 24, 2016 (JP) .................................. 2016-032902
Feb. 7, 2017 (JP) .................................. 2017-020108

(51) Int. Cl.
A23L 7/113    (2016.01)
A23P 30/20    (2016.01)
A21C 3/02     (2006.01)

(52) U.S. Cl.
CPC ............... *A23L 7/113* (2016.08); *A23P 30/20* (2016.08); *A21C 3/024* (2013.01)

(58) Field of Classification Search
CPC .......... A23L 7/109; A23L 7/111; A23L 7/113; A23P 30/20; A21C 1/006; A21C 3/02; A21C 3/024; A21C 3/04; A21C 11/22; A21C 3/10; A21C 9/00; A21C 9/02; A21C 11/00; A21C 11/10; A21C 11/103; A21C 11/16; A21C 11/24; A21C 15/00; A21C 3/021; A21C 3/025; A21C 3/027; A21C 11/08; A23V 2300/16; A23V 2002/00; B29K 2105/007; B29C 43/44; B29C 43/46; B29C 44/30; B29C 44/306; B29C 48/001; B29C 48/0011; B29C 48/35; B29C 55/18; B30B 3/00; B30B 3/04; B30B 9/38
USPC ........ 426/438–440, 451, 506, 511, 512, 517, 426/508, 510, 518, 557
See application file for complete search history.

(56) References Cited

U.S. PATENT DOCUMENTS

| | | | | |
|---|---|---|---|---|
| 2,366,366 A * | 1/1945 | Souder | ................. | A21C 11/00 426/402 |
| 4,243,689 A * | 1/1981 | Kokeguchi | ............. | A23L 7/109 426/242 |
| 4,370,352 A * | 1/1983 | Murakami | ............. | A23L 7/109 426/557 |
| 4,394,397 A * | 7/1983 | Lometillo | ................. | A23L 7/17 426/448 |
| 4,529,609 A * | 7/1985 | Gaehring | ................. | A23L 7/111 426/532 |
| 4,626,439 A * | 12/1986 | Meyer | ................. | A01J 25/008 426/517 |
| 4,675,199 A * | 6/1987 | Hsu | ......................... | A21C 3/04 425/325 |
| 5,186,539 A * | 2/1993 | Manser | ................. | A21C 1/003 366/85 |
| 5,840,359 A * | 11/1998 | Lechthaler | ............... | A21C 3/04 426/516 |
| 5,916,619 A * | 6/1999 | Miyazaki | ....... | C12Y 302/01001 426/18 |
| 6,042,866 A * | 3/2000 | Greene | ................. | A23L 7/111 426/451 |
| 6,322,345 B1 * | 11/2001 | Zaltron | ................. | A21C 3/02 425/363 |

(Continued)

FOREIGN PATENT DOCUMENTS

| | | |
|---|---|---|
| CN | 1083698 | 5/2002 |
| CN | 101288446 | 10/2008 |

(Continued)

OTHER PUBLICATIONS

JP2000245377A translation, published Sep. 12, 2009 (Year: 2009).*

(Continued)

*Primary Examiner* — Erik Kashnikow
*Assistant Examiner* — Bryan Kim
(74) *Attorney, Agent, or Firm* — HSML P.C.

(57) ABSTRACT

[Problem to be Solved] An object of the present invention is to provide a method for producing instant fried noodles having a lower fat or oil content than usual fried noodles.

[Solution] In a method for producing fried noodles of the present invention, in rolling out a noodle belt with a plurality of pressing rollers, a large diameter roller having a larger diameter of 400 mm or more than usual is used as at least one of the pressing rollers, and thus, a fat or oil content of the resultant fried noodles is reduced. Besides, when the noodle belt is made by extrusion performed under reduced pressure, and a compression of the noodle belt obtained by using the large diameter roller set to be high, the fat or oil content is further reduced.

5 Claims, No Drawings

(56) References Cited

U.S. PATENT DOCUMENTS

| | | | |
|---|---|---|---|
| 6,596,331 B1 * | 7/2003 | Nobuyasu | A23L 7/111 426/325 |
| 8,597,707 B2 * | 12/2013 | Ishii | A23P 30/10 426/451 |
| 8,647,693 B2 * | 2/2014 | Chen | A23L 7/113 426/557 |
| 2002/0001659 A1 | 1/2002 | Takahashi et al. | |
| 2010/0323070 A1 | 12/2010 | Seto et al. | |
| 2012/0288607 A1 * | 11/2012 | Takahashi | A23L 7/113 426/557 |
| 2015/0086689 A1 | 3/2015 | Machida et al. | |
| 2015/0150267 A1 * | 6/2015 | Haas | A21C 3/02 425/363 |

FOREIGN PATENT DOCUMENTS

| | | | | |
|---|---|---|---|---|
| CN | 104203001 | | 12/2014 | |
| EP | 0 754 409 | | 1/1997 | |
| GB | 669627 A | * | 4/1952 | A21C 3/02 |
| JP | 61-135531 | | 6/1986 | |
| JP | 63-269960 | | 11/1988 | |
| JP | 2-097361 | | 4/1990 | |
| JP | 4-112762 | | 4/1992 | |
| JP | 5-137527 | | 6/1993 | |
| JP | 2599208 B2 | | 4/1997 | |
| JP | 2000-217500 | | 8/2000 | |
| JP | 2000-236821 | | 9/2000 | |
| JP | 2000-245377 | | 9/2000 | |
| JP | 2000245377 A | * | 9/2000 | |
| JP | 2006-067845 | | 3/2006 | |
| JP | 2010-004775 | | 1/2010 | |
| JP | 2010-130940 | | 6/2010 | |
| JP | 5039716 | | 10/2012 | |
| TW | I465198 | | 12/2014 | |

OTHER PUBLICATIONS

"Noodle Book", newly revised, Shokuhin Sangyo Shimbunsha Co., Ltd., 2003, pp. 65 (a concise explanation of relevance can be found in paragraph [0005] of the Specification).
International Search Report issued in International Application No. PCT/JP2017/005416, Apr. 6, 2017, 5 pages.
Written Opinion issued in International Application No. PCT/JP2017/005416, Apr. 6, 2017, 6 pages.
Office Action issued in corresponding Chinese Patent Application No. 201780003241.3, Dec. 6, 2018, 10 pages with an English translation.
The Extended European Search Report in European patent application No. 17756325.1, dated Oct. 2, 2019, 8 pages.
Office Action issued for the corresponding Chinese Patent Application No. 201780003241.3, Apr. 8, 2020, 9 pages including partial translation.
1 Office Action issued for the Indian patent application No. 201817010391, Jun. 7, 2021, 4 pages.

* cited by examiner

METHOD FOR PRODUCING INSTANT FRIED NOODLES

TECHNICAL FIELD

The present invention relates to a method for producing instant fried noodles.

BACKGROUND ART

Methods for producing instant noodles are conventionally roughly divided into those for fried noodles and those for non-fried noodles. Fried noodles are noodles obtained by drying gelatinized noodles by performing a frying treatment in an oil at about 150° C. On the other hand, non-fried noodles are noodles obtained by drying gelatinized noodles by a method except for frying in an oil, and there are several employable methods, among which a hot-air drying method for drying with hot air at about 70 to 100° C. at a rate of about 4 m/s or less for 30 minutes to 90 minutes is generally employed.

Since moisture contained in fried noodles is evaporated during the frying treatment to form a porous structure, the fried noodles are good in reconstitutability, and characteristically have a snack-like flavor peculiar to the fried noodles owing to an oil, and a variety of types of instant noodles including those served in plastic bags or cup-shaped containers are currently commercially available. The fried noodles contain, however, a large amount of oil, and hence have higher calories than the non-fried noodles. Therefore, attempts are being made to develop fried noodles having a reduced fat or oil content (for example, Patent Literatures 1 to 3).

Patent Literature 1 discloses, as a method for producing fried noodles having a low fat or oil content and free from browning caused by kansui, a technique in which a dough having a pH of 7.5 to 8.5 is prepared by kneading sodium carbonate and/or potassium carbonate in an amount of 0.3 to 0.6% by weight with respect to a noodle material powder and an acid is substance, the resultant dough is extruded or rolled out and then cut to obtain raw noodle strings, and the thus obtained raw noodle strings are steamed, flavored and dried by frying. This method is an excellent method for reducing a fat or oil content of fried noodles, but it is necessary to use large amounts of kansui and the acidic substance for pH adjustment.

The inventors have proposed, as a method for reducing a fat or oil content without making a special change in a raw material of fried noodles, a method for producing fried noodles in which the number of rolling operations with a pressing roller is set to one to three (Patent Literatures 2 and 3). In machine noodle making, the noodle belt made in advance is rolled out with a roller so that the noodle belt has a predetermined thickness, and in general, the noodle belt is rolled out successively dividedly in several times so as not to damage gluten tissue by applying an excessive force to the dough, and hence, it is necessary to increase the number of rollers if efficiency is desired to increase (Non Patent Literature 1). In the inventions described in Patent Literatures 2 and 3, however, the number of rolling operations with a roller is intentionally reduced as compared with that of a usual method, so that an inside structure of noodle stings can be inhibited from becoming porous through formation of a layered gluten network, and thus, the fat or oil content is reduced.

CITATION LIST

Patent Literature

Patent Literature 1: Japanese Patent No. 5039716
Patent Literature 2: Japanese Patent Application No. 2015-187681
Patent Literature 3: Japanese Patent Application No. 2015-187682
Patent Literature 4: Japanese Patent Laid-Open No, 2010-4775
Non Patent Literature 1: Men no Hon (Book on Noodles) newly revised edition, revised in 2003, Shokuhin Sangyo Shinbunsha Co., Ltd., p. 65

SUMMARY OF INVENTION

Technical Problem

An object of the present invention is to provide a method for producing instant fried noodles having a lower fat or oil content than usual fried noodles.

Solution to Problem

During studies on formation of gluten tissue in a rolling operation, the inventors found the following: When the number of rolling operations with a pressing roller is set to one to three, and in addition, when a large-diameter roller having a diameter of 400 mm or more, and preferably a diameter of 500 mm or more is used as at least one of a plurality of pressing rollers used in the rolling operation with the rollers, a fat or oil content of resultant fried noodles can be further reduced. Thus, the present invention was accomplished.

Specifically, a first aspect of the present invention is a method for producing instant fried noodles, including: a noodle belt making step of adding kneading water to a raw material powder followed by kneading by an ordinary method to make a dough, and making a noodle belt from the dough; a noodle belt rolling step of rolling out the noodle belt into a predetermined noodle thickness by a predetermined number of rolling operations with one or more pressing rollers; and a step of cutting the rolled out noodle belt with a cutting blade roller to obtain raw noodle strings, and steaming and frying/drying the raw noodle strings, in which at least one of the pressing rollers is a large diameter roller having a diameter of 400 mm or more.

A second aspect of the present invention relates to the method for producing instant fried noodles according to the first aspect of the present invention, in which the number of rolling operations in the noodle belt rolling step is three or less.

A third aspect of the present invention relates to the method for producing instant fried noodles according to the first or second aspect of the present invention, in which a compression of the noodle belt obtained using the large diameter roller is 90% or more.

DESCRIPTION OF EMBODIMENT

The present invention will now be described in detail. It is noted that the present invention is not limited to the following description. Incidentally, the type of instant fried noodles produced in the present invention is not especially limited, and may be any one of those usually known in the technical field. Examples include udon (wheat noodles), soba (buckwheat noodles), Chinese noodles, and pastas.

1. Raw Material Formulation

For the instant fried noodles of the present invention, any of raw materials of usual instant noodles can be used. Specifically, as a raw material powder, a single one of or a mixture of flours such as a wheat flour, a buckwheat flour and a rice flour, and various starches such as a potato starch, a tapioca starch and a cornstarch may be used. As the starch, a raw starch, a gelatinized starch, or a modified starch such as an acetylated starch, an etherified starch, or a crosslinked starch can be used. Besides, in the present invention, any of a salt, an alkaline agent, various thickeners, a noodle quality modifier, edible fats and oils, various pigments such as a carotene pigment, and preservatives that are generally used in production of instant noodles can be added to the raw material powder. Such an additional component may be added in the form of a powder together with the raw material powder, or may be dissolved or suspended in kneading water for the addition.

2. Making Dough

A method for making a dough in the present invention may be performed in accordance with an ordinary method. Specifically, a batch mixer, a flow let mixer, a vacuum mixer or the like is used for kneading, for homogeneously mixing, the noodle material powder and the kneading water, and thus, a crumb-like dough may be made. At this point, if the amount of the kneading water added is too large, the resultant dough is in the shape of balls, which makes it difficult to subsequently prepare a noodle belt or to perform a rolling operation, and in addition, excessive foams are formed in a frying treatment due to excessive moisture to accelerate replacement of moisture with a fat or oil, and hence a fat or oil content is difficult to be reduced. The amount of water added in the form of the kneading water depends on the temperature of the dough, and the kneading water is preferably added so that a moisture content in the resultant noodle belt can be preferably 25 to 45% by weigh, and more preferably 30 to 40% by weight.

3. Making Noodle Belt

The dough made as described above is used for making a noodle belt. Examples of a method for making a noodle belt include: (1) a method in which the dough is formed into a crude noodle belt using a shaping roller, and the crude noodle belt is formed into a compounded noodle belt through a compounding roller; and (2) a method in which the dough is extruded into a noodle belt using an extruder or the like under normal pressure or reduced pressure, or extruded into the shape of a small lump to be made into a noodle belt using a shaping roller.

4. Rolling and Cutting

Subsequently, the noodle belt is rolled out into a predetermined noodle thickness by a predetermined number of rolling operations using a pressing roller, and the noodle belt thus having the predetermined noodle thickness is cut with a cutting blade roller, and thus, raw noodle strings are obtained.

At least one pressing rollers used in a rolling step is preferably a large diameter roller having a diameter of 400 mm or more, and preferably 500 mm or more. A diameter of a pressing roller used in machine production of instant noodles is 300 mm at most in general (Patent Literature 4), and a pressing roller having a diameter of 400 mm or more, or a diameter of 500 mm or more is far from a usually employed size. As the diameter of a pressing roller is larger, a contact area between the pressing roller and the noodle belt is larger, or a contact time between the pressing roller and the noodle belt is longer, and therefore, an accumulated pressure applied to the noodle belt is increased, so that formation of a layered gluten network can be inhibited.

When the formation of a layered gluten network is inhibited, the moisture present in the noodle strings is more freely foamed, and hence, an average size of respective pores is increased but the number of pores present in a cross section of the noodle strings and a porosity are reduced. Therefore, an amount of a frying oil absorbed into the pores present within the noodle strings is reduced, resulting in reducing a fat or oil content of the noodle strings.

The number of rolling operations with a roller in the present invention not especially limited, and when the number of rolling operations is set to one to three as disclosed in Patent Literatures 2 and 3, the formation of a layered gluten network can be inhibited to effectively reduce a fat or oil content.

Besides, a rolling degree in the rolling operation with a roller is not especially limited, and in the rolling operation using a large diameter roller, when the rolling degree of the rolling operation is set to be high, specifically set to 90% or more compression, and preferably 92% or more, a contact area between the roller and the noodle belt becomes large, and a contact time therebetween becomes long, and therefore, the fat or oil content of resultant fried noodles can be further reduced.

5. Gelatinizing Step

Subsequently, the thus obtained raw noodle strings are gelatinized by steaming and/or boiling by an ordinary method. As a steaming method, not only heating with saturated water vapor but also heating with superheated water vapor can be employed.

6. Flavoring Step

In the present invention, the noodle strings thus gelatinized can be seasoned by causing a seasoning liquid (a liquid seasoning) to adhere thereto by spraying, dipping or the like. This flavoring step need not be always performed but may be omitted.

7. Cutting and Charging

Subsequently, the noodle strings are cut into a length of 20 to 50 cm corresponding to one meal amount. The thus cut noodle strings are charged into a metal frying/drying tool called a fry retainer composed of a lid and a container.

8. Frying/Drying Step

The fry retainer in which the noodles have been put is moved in a metal tank, called a fryer, holding an edible oil heated to about 130 to 160° C. for dipping the noodles in the oil and thus, moisture present in the noodles is evaporated for drying the noodles. Examples of the edible oil used here include palm oil and lard and the like. The noodles are dried so that a moisture content of 1 to 8% by weight can be obtained after the frying/drying step.

9. Cooling Step

After the frying/drying, the lid is removed, and a noodle lump is taken out of the container. The noodle lump taken out is cooled for a predetermined period of time to obtain instant fried noodles.

10. Additional Step

The cooled instant fried noodles are transferred to a packaging step to be packaged in a cup or a bag together with a soup and other ingredients, and the resultant is sold as an instant fried noodle product.

In this manner, a dough made by kneading a raw material powder with kneading water added thereto is formed into a noodle belt by an ordinary method, the noodle belt is rolled out into a predetermined noodle thickness by using at least one large diameter roller, then the noodle belt is cut with a cutting blade roller to obtain raw noodle strings, the thus obtained noodle strings are steamed and dried by frying, and thus, instant fried noodles having a reduced fat or oil content can be produced. Besides, the production method of the present invention provides an incidental effect that a frying time is shortened, and an effect that the resultant fried noodles can be reconstituted with boiling water or the like faster than fried noodles produced by a usual method.

EXAMPLES

The present embodiment will now be described in more details with reference to examples.

(Test Group A1-1)

Nine hundred (900) g of wheat flour and 100 g of starch were mixed to obtain a powder mixture, 15 g of salt, 2.3 g of kansui, and 340 ml of kneading water containing 0.4 g of polyphosphate dissolved therein were added to the powder mixture, and the resultant was kneaded with a normal pressure high-speed mixer for 3 minutes to prepare a crumb-like dough.

The dough thus made was extruded under normal pressure using an extruder to prepare a noodle belt with a thickness of 10 mm.

The noodle belt, with a thickness of 10 mm made as described above was compressed by 92% using a large diameter roller having a diameter of 600 mm to prepare a noodle belt with a thickness of 0.80 mm. A peripheral speed of the roller was set to 4 m/min, and the thus rolled out noodle belt was cut into noodle strings with a #20 square cutting blade roller.

The thus cut noodle strings were immediately steamed for 2 minutes in a steam chamber to which saturate water vapor was supplied at 240 kg/h.

The steamed noodle strings were dipped for 5 seconds in a flavoring liquid in which 90 g of salt, 13.5 g of glutamic acid, 10 ml of soy sauce and 30 g of a meat extract were dissolved per L, and then the resultant noodle strings were cut into a length of 30 cm when stretched.

The cut noodle strings were put, in an amount of 100 g in terms of flavored noodle strings, in a metal container, which was in the shape of a cup having a topside diameter of 87 mm, an underside diameter of 72.5 mm and a height of 60 mm, and had a large number of holes with a diameter of 2.9 mm formed on the underside, the container was covered with a metal lid similarly having a large number of holes with a diameter of 2.9 mm, and the resultant was dipped in a fryer heated to 150° C. for frying/drying.

The frying was completed when no steam bubbles were generated from the thus obtained fried noodles.

The fried noodles thus dried by frying were crushed and homogenized, and a fat or oil content therein was analyzed by the Soxhlet extraction method.

(Test Group A1-2)

A sample of fried noodles was made in the same manner as Test Group A1-1 except that the noodle belt made in advance was rolled out with a large diameter roller having a diameter of 450 mm.

(Test Group A1-3)

A sample of fried noodles was made in the same manner as Test Group A1-1 except that the noodle belt made in advance was rolled out with a large diameter roller having a diameter of 240 mm.

(Test Group A1-4)

A sample of fried noodles was made in the same manner as Test Group A1-1 except that the noodle belt made in advance was rolled out with a large diameter roller having a diameter of 180 mm.

(Test Group A1-5)

A sample of fried noodles was made in the same manner as Test Group A1-1 except that the noodle belt made in advance was rolled out with a large diameter roller having a diameter of 90 mm.

(Test Group B1-1)

A sample of fried noodles was made in the same manner as Test Group A1-1 except that the dough made in advance was extruded through an extruder under reduced pressure of 0.07 MPa (530 mmHg) to prepare a noodle belt with a thickness of 10 mm.

(Test Group B1-2)

A sample of fried noodles was made in the same manner as Test Group B1-1 except that the noodle belt made in advance was rolled out with a large diameter roller having a diameter of 450 mm.

(Test Group B1-3)

A sample of fried noodles was made in the same manner as Test Group B1-1 except that the noodle belt made in advance was rolled out with a pressing roller having a diameter of: 240 mm.

(Test Group B1-4)

A sample of fried noodles was made in the same manner as Test Group B1-1 except that the noodle belt made in advance was rolled out with a pressing roller having a diameter of 180 mm.

(Test Group B1-5)

A sample of fried noodles was made in the same manner as Test Group B1-1 except that the noodle belt made in advance was rolled out with a pressing roller having a diameter of 90 mm.

(Test Group A2-1)

A noodle belt with a thickness of 10 mm obtained by extrusion with an extruder under normal pressure was compressed by 90% using a large diameter roller having a diameter of 600 mm in a first rolling operation to prepare a noodle belt with a thickness of 1 mm. At this point, a peripheral speed of the roller was set to 4 m min.

Subsequently, the noodle belt was further compressed by 20% by a second rolling operation using a pressing roller having a diameter of 90 mm to prepare a noodle belt with a thickness of 0.8 mm. At this point, a peripheral speed of the roller was set to 18 m/min. Other conditions were the same as those employed for Test Group A1-1.

(Test Group A2-2)

A sample of fried noodles was made in the same manner as Test Group A2-1 except that the noodle belt made in advance was rolled out with a large diameter roller having a diameter of 450 mm in the first rolling operation.

(Test Group A2-3)

A sample of fried noodles was made in the same manner as Test Group A2-1 except that the noodle belt made in advance was rolled out with a pressing roller having a diameter of 240 mm in the first rolling operation.

(Test Group A2-4)

A sample of fried noodles was made in the same manner as Test Group A2-1 except that the noodle belt made in advance was rolled out with a pressing roller having a diameter of 180 mm in the first rolling operation.

(Test Group A2-5)

A sample of fried noodles was made in the same manner as Test Group A2-1 except that the noodle belt made in advance was rolled out with a pressing roller having a diameter of 90 mm in the first rolling operation.

(Test Group B2-1)

A sample of fried noodles was made in the same manner as Test Group A2-1 except that a noodle belt with a thickness of 10 mm was made by extruding the dough made in advance through an extruder under reduced pressure of 0.07 MPa (530 mmHg).

(Test Group B2-2)

A sample of fried noodles was made in the same manner as Test Group B2-1 except that the noodle belt made in advance was rolled out with a large diameter roller having a diameter of 450 mm in the first rolling operation.

(Test Group B2-3)

A sample of fried noodles was made in the same manner as Test Group B2-1 except that the noodle belt made in advance was rolled out with a pressing roller having a diameter of 240 mm in the first rolling operation.

(Test Group B2-4)

A sample of fried noodles was made in the same manner as Test Group B2-1 except that the noodle belt made in advance was rolled out with a pressing roller having a diameter of 180 mm in the first rolling operation.

(Test Group B2-5)

A sample of fried noodles was made in the same manner as Test Group B2-1 except that the noodle belt made in advance was rolled out with a pressing roller having a diameter of 90 mm in the first rolling operation.

(Test Group A3-1)

A noodle belt with a thickness of 10 mm obtained by extrusion with an extruder under normal pressure was compressed by 88% using a large diameter roller having a diameter of 600 mm in a first rolling operation to prepare a noodle belt with a thickness of 1.2 mm. At this point, a peripheral speed of the roller was set to 4 m/min.

Subsequently, the noodle belt was further compressed by 16.67% by a second rolling operation with a pressing roller having a diameter of 90 mm to prepare a noodle belt with a thickness of 1 mm.

Besides, the noodle belt was further compressed by 20% by a third rolling operation with a pressing roller having a diameter of 90 mm to prepare a noodle belt with of 0.8 mm. In the second and third rolling a thickness operations, a peripheral speed of the roller was set to 18 m/min.

Other conditions were the same as those employed for Test Group A1-1.

(Test Group A3-2)

A sample of fried noodles was made in the same manner as Test Group A3-1 except that the noodle belt made in advance was rolled out with a large diameter roller having a diameter of 450 mm in the first rolling operation.

(Test Group A3-3)

A sample of fried noodles was made in the same manner as Test Group A3-1 except that the noodle belt made in advance was rolled out with a pressing roller having a diameter of 240 mm in the first rolling operation.

(Test Group A3-4)

A sample of fried noodles was made in the same manner as Test Group A3-1 except that the noodle belt made in advance was rolled out with a pressing roller having a diameter of 180 mm in the first rolling operation.

(Test Group A3-5)

A sample of fried noodles was made in the same manner as Test Group A3-1 except that the noodle belt made in advance was rolled out with a pressing roller having a diameter of 90 mm in the first rolling operation.

(Test Group B3-1)

A sample of fried noodles was made in the same manner as Test Group A3-1 except that a noodle belt with a thickness of 10 mm was made by extruding the dough made in advance through an extruder under reduced pressure of 0.07 MPa (530 mmHg).

(Test Group B3-2)

A sample of fried noodles was made in the same manner as Test Group B3-1 except that the noodle belt made in advance was rolled out with a large diameter roller having a diameter of 450 mm in the first rolling operation.

(Test Group B3-3)

A sample of fried noodles was made in the same manner as Test Group B3-1 except that the noodle belt made in advance was rolled out with a pressing roller having a diameter of 240 mm in the first rolling operation.

(Test Group B3-4)

A sample of fried noodles was made in the same manner as Test Group B3-1 except that the noodle belt made in advance was rolled out with a pressing roller having a diameter of 180 mm in the first rolling operation.

(Test Group B3-5)

A sample of fried noodles was made in the same manner as Test Group B3-1 except that the noodle belt made in advance was rolled out with a pressing roller having a diameter of 90 mm in the first rolling operation.

(Test Group C1-1)

A sample of fried noodles was made in the same manner as Test Group A1-1 except that the peripheral speed employed in the rolling operation with a roller was set to 10 m/min.

(Test Group C1-2)

A sample of fried noodles was made in the same manner as Test Group A1-2 except that the peripheral speed employed in the rolling operation with a roller was set to 10 m/min.

(Test Group C1-3)

A sample of fried noodles was made in the same manner as Test Group A1-3 except that the peripheral speed employed in the rolling operation with a roller was set to 10 mi min (Test Group C2-1)

A sample of fried noodles was made in the same manner as Test Group A2-1 except that the peripheral speed employed in the first rolling operation with a roller was set to 10 m/min.

(Test Group C3-1)

A sample of fried noodles was made in the same manner as Test Group A3-1 except that the peripheral speed employed in the first rolling operation with a roller was set to 10 m min.

(Test Group D1-1)

A sample of fried noodles was made in the same manner as Test Group B1-1 except that the peripheral speed employed in the rolling operation with a roller was set to 10 m/min.

(Test Group D2-1)

A sample of fried noodles was made in the same manner as Test Group B2-1 except that the peripheral speed employed in the first rolling operation with a roller was set to 10 m/min.

(Test Group D3-1)

A sample of fried noodles was made in the same manner as Test Group B3-1 except that the peripheral speed employed in the first rolling operation with a roller was set to 10 m/min, The production conditions employed for the respective test groups described above are shown in Table 1 and Table 2, and fat or oil contents of the samples of the fried noodles made in the respective test groups are shown in Table 3 and Table 4.

TABLE 1

Rolling Speed: 4 m/min (First Rolling)

| | Normal Pressure Extrusion | | | Reduced Pressure Extrusion | | |
|---|---|---|---|---|---|---|
| Roller Diameter | Number of Rolling Operations | | | | | |
| (First Rolling) | 1 | 2 | 3 | 1 | 2 | 3 |
| 600 mm | A1-1 | A2-1 | A3-1 | B1-1 | B2-1 | B3-1 |
| 450 mm | A1-2 | A2-2 | A3-2 | B1-2 | B2-2 | B3-2 |
| 240 mm | A1-3 | A2-3 | A3-3 | B1-3 | B2-3 | B3-3 |
| 180 mm | A1-4 | A2-4 | A3-4 | B1-4 | B2-4 | B3-4 |
| 90 mm | A1-5 | A2-5 | A3-5 | B1-5 | B2-5 | B3-5 |

TABLE 2

Rolling Speed: 10 m/min (First Rolling)

| | Normal Pressure Extrusion | | | Reduced Pressure Extrusion | | |
|---|---|---|---|---|---|---|
| Roller Diameter | Number of Rolling Operations | | | | | |
| (First Rolling) | 1 | 2 | 3 | 1 | 2 | 3 |
| 600 mm | C1-1 | C2-1 | C3-1 | D1-1 | D2-1 | D3-1 |
| 450 mm | C1-2 | | | | | |
| 240 mm | C1-3 | | | | | |

TABLE 3

Rolling Speed: 4 m/min (First Rolling)

| | Normal Pressure Extrusion | | | Reduced Pressure Extrusion | | |
|---|---|---|---|---|---|---|
| Roller Diameter | Number of Rolling Operations | | | | | |
| (First Rolling) | 1 | 2 | 3 | 1 | 2 | 3 |
| 600 mm | 11.9% | 12.3% | 15.1% | 10.9% | 11.8% | 13.2% |
| 450 mm | 12.9% | 13.1% | 15.4% | 11.2% | 12.1% | 13.5% |
| 240 mm | 14.2% | 14.3% | 15.9% | 11.5% | 12.5% | 14.0% |
| 180 mm | 14.8% | 14.5% | 16.0% | 12.3% | 13.3% | 14.7% |
| 90 mm | 15.2% | 15.6% | 17.5% | 14.5% | 14.5% | 14.8% |
| Reduction in Fat or Oil Content of Test Group using Roller of 600 mm in Comparison to Test Group using Roller of 90 mm | 3.3% | 3.3% | 2.4% | 3.6% | 2.7% | 1.6% |

TABLE 4

Rolling Speed: 10 m/min (First Rolling)

| | Normal Pressure Extrusion | | | Reduced Pressure Extrusion | | |
|---|---|---|---|---|---|---|
| Roller Diameter | Number of Rolling Operations | | | | | |
| (First Rolling) | 1 | 2 | 3 | 1 | 2 | 3 |
| 600 mm | 13.4% | 12.8% | 15.4% | 11.9% | 12.3% | 14.4% |
| 450 mm | 14.7% | | | | | |
| 240 mm | 16.5% | | | | | |

As shown in Table 3 and Table 4, in all the test groups, as the diameter of the roller is larger, a fat or oil content of the resultant fried noodles is lower, and thus, it is understood that a fat or oil content can be reduced by 1.6% to 3.6% in a case where the large diameter roller having a diameter of 600 mm is used as compared with a case where the pressing roller having a diameter of 90 mm is used. This is probably for the following reason: When a large diameter pressing roller far from a size usually employed in production of fried noodles is used, a contact area between the pressing roller and the noodle belt becomes large, or a contact time with the noodle belt becomes long, and therefore, an accumulated pressure applied to the noodle belt is increased, resulting in inhibiting formation of a layered gluten network.

When the formation of a layered gluten network is inhibited, the moisture present in the noodle strings is more treely foamed, and hence, an average size of respective pores is increased but the number of pores present in a cross section of the noodle strings and a porosity are reduced, resulting in reducing an amount of a frying oil absorbed into the pores.

With respect to the results of Test Groups A, reduction amounts of the fat or oil content are merely 1% and 4% respectively in Test Groups A1-3 and A1-4 respectively using the pressing rollers having a diameter of 240 mm and 180 mm as compared with that in Test Group A1-5 using the pressing roller having a diameter of 90 mm, but reduction amounts of the fat or oil content in Test Groups A1-1 and A1-2 respectively using the large diameter rollers having a diameter of 600 mm and 450 mm are 3.3% and 2.3% respectively, and thus, it is understood that the use of the large diameter roller makes a large contribution to the reduction of the fat or oil content.

Besides, the compression of a noodle belt obtained by using the large diameter roller is preferably higher. When the compression of the noodle belt is high, the contact area between the pressing roller and the noodle belt becomes large, or the contact time with the noodle belt becomes long, and therefore, the fat or oil content can be further reduced owing to a synergistic effect with the large diameter roller.

In Test Groups A1, B1, C1 and D1, the number of rolling operations is one, and the compression of the noodle belt is as high as 92%, and therefore, it is understood that the fat or oil content in the fried noodles is lower as a whole than in Test groups A2, B2, C2, and D2 in which the number of rolling operations is two and the compression of the noodle belt in the first rolling operation is 90%, and then in Test Groups A3, B3, C3, and D3 in which the number of rolling operations is three and the compression of the noodle belt in the first rolling operation is 88%.

As the number of rolling operations is increased, the accumulated contact time between the pressing roller and the noodle belt becomes long, but a gluten network structure present in the noodle belt is stretched to be layered through the rolling operation performed plural times, and hence the fat or oil content is increased to the contrary. Therefore, the number of rolling operations is preferably three or less, preferably one or two.

Through comparison of the results between Test Groups A and B and between Test Groups C and D, the fat or oil content of the produced fried noodles is lower when she extrusion is performed under reduced pressure than when performed under normal pressure, and thus, it is understood that the extrusion performed under reduced pressure is effective to reduce the fat or oil content. This is probably because when a noodle belt is extruded under reduced pressure, the noodle belt is degassed as well as a pressure against the noodle belt is increased, and hence, the formation of a layered gluten network structure is inhibited. However, when the degree of reduced pressure is too large, a blister is easily caused in the surface of noodle strings, and therefore, the reduced pressure is preferably 600 mHg or less.

Next, through comparison between Test Groups G and D in which the peripheral speed in the first rolling operation is 10 m/min and Test Groups A and B in which the peripheral speed in the first rolling operation is 4 m/min, it is understood that the fat or oil contents of the samples made in Test Groups C and D are higher than those of Test Groups A and B. This is probably because when the peripheral speed in the rolling operation is higher, the contact time between the noodle belt and the roller becomes short, and hence the accumulated pressure applied to the noodle belt is reduced. A higher peripheral speed in the rolling operation enables mass production, and therefore, a fat or oil content is reduced preferably by combining the approaches of (1) making a noodle belt through the extrusion under reduced pressure, (2) using a large diameter roller, (3) decreasing the number of rolling operations, and (4) employing a high compression of the noodle belt.

Through comparison between Test. Group A1-3 in which the peripheral speed in the first rolling operation is 4 m/min and the pressing roller having a diameter of 240 mm is used, and Test Group C1-3 in which the peripheral speed of the first rolling operation is 10 m/min and the pressing roller having the same diameter of 240 mm is used, it is understood that the fat or oil content of the fried noodles made in Test Group C1-3 employing the higher peripheral speed is higher than that of Test Group A1-3 by 2.3%.

On the other hand, through comparison between Test Group A1-1 in which the peripheral speed in the first rolling operation is 4 m/min and the pressing roller having a diameter of 600 ram is used, and Test Group C1-1 in which the peripheral speed of the first rolling operation is 10 m/min and the pressing roller having the same diameter of 600 mm is used, a difference in the fat or oil content therebetween is merely 1.5%, and thus, it is understood that a large diameter roller is effective to reduce a fat or oil content in industrial production of fried noodles employing a higher peripheral speed in a rolling operation.

Incidentally, when the rolling operation is performed a plurality of times, it goes without saying that a fat or oil content can be reduced if a large diameter roller is used in at least once among the plural times of the rolling operation.

The invention claimed is:

1. A method for producing instant fried noodles, comprising:
    making a noodle belt by adding kneading water to a raw material powder followed by kneading so as to make a dough, and extruding the dough through an extruder under normal pressure so as to make the noodle belt;
    rolling out the noodle belt into a determined noodle thickness by a rolling operation performed no more than once or twice once or twice, each rolling operation using a pressing roller;
    cutting the rolled out noodle belt with a cutting blade roller so as to obtain raw noodle strings;
    steaming the raw noodle strings; and
    drying the steamed raw noodle strings by frying so as to obtain the instant fried noodles,
    wherein the noodle belt subjected to the rolling out is a single noodle belt made of the dough by the extruding,
    a single rolling operation of the rolling out compresses the noodle belt at a compression ratio in a range of 90% or more, and
    the single rolling operation is performed with a large-diameter pressing roller having a diameter in a range from 400 mm to 600 mm, and
    wherein a fat or oil content of the fried noodles is reduced by 2.3% to 3.3% by weight compared with a fat or oil content of instant noodles prepared by using a pressing roller having a diameter of 90 mm for the single rolling operation.

2. The method for producing instant fried noodles according to claim 1, wherein the large-diameter pressing roller has a diameter in a range from 450 mm to 600 mm.

3. The method for producing instant fried noodles according to claim 1, wherein the fat or oil content of the instant fried noodles is lower than a fat or oil content of instant fried noodles prepared by using a pressing roller having a diameter in a range of greater than 90 mm and up to 240 mm for the single rolling operation.

4. The method for producing instant fried noodles according to claim 2, wherein the fat or oil content of the instant fried noodles is lower than a fat or oil content of instant fried noodles prepared by using a pressing roller having a diameter in a range of greater than 90 mm and up to 240 mm for the single rolling operation.

5. The method for producing instant fried noodles according to claim 1, wherein a formation of a layered gluten network in the instant fried noodles is suppressed compared with a formation of a layered gluten network in instant fried noodles prepared by using a pressing roller having a diameter of 90 mm for the single rolling operation.

* * * * *